United States Patent

[11] 3,590,633

[72] Inventors: Wolfgang Fuhrmann; Rudolf Nusslein; Waldmar Seifert, all of Nurnberg, Germany
[21] Appl. No. 17,020
[22] Filed Mar. 9, 1970
[45] Patented July 6, 1971
[73] Assignee Maschinenfabrick Augsburg-Nurnberg Aktiengesellschaft Nurnberg, Germany
[32] Priority Nov. 16, 1966
[33] Germany
[31] M 71 665
Continuation of application Ser. No. 683,642, Nov. 16, 1967.

[54] STRESS MEASURING OF ROTATING BODIES
3 Claims, 3 Drawing Figs.
[52] U.S. Cl. ................................................... 73/146, 73/133
[51] Int. Cl. ................................................... G01m17/02, G01l 5/16
[50] Field of Search ........................................... 73/117.4, 133, 146

[56] References Cited
UNITED STATES PATENTS
3,142,178 7/1964 Grough et al. ............ 73/146
3,206,973 9/1965 Obarski .................... 73/146
OTHER REFERENCES
Lippman, SAE JOURNAL, Sept. 1965 Vol. 73, No. 9, pp. 86— 89

Primary Examiner—Charles A. Ruehl
Attorney—Stephen, Huetting & O'Connell

ABSTRACT: The tension and compression stresses and the flexural torque and maximum torque in a rotating body, such as a vehicle tire, are measured by dividing the tension and compression forces into the $x$–$x$, $y$–$y$ and $z$–$z$ axes and the moments into the $Mx$ and $Mz$ axes. Separate load cells are used to measure each force or moment, respectively.

INVENTORS
Wolfgang Fuhrmann
Rudolf Nüsslein
Waldemar Seifert

BY Stephens, Huettig, and O'Connell
ATTORNEYS

STRESS MEASURING OF ROTATING BODIES

This is a continuation of application Ser. No. 683,642, filed Nov. 16, 1967.

This invention relates to an apparatus for determining the size of multiaxial stresses in rotating machine parts and especially of the tension and compression forces affecting truck tires, as well as the flexural moments and overturning moments.

Wind tunnel experiments have shown that the forces and moments on the bodies being tested can be measured at the same time in open structures. However, such open test structures cannot be structurally compacted into a closed measuring hub which can be mounted, for example, in tire-testing machines or vehicles so that the measurements can be accomplished in street driving tests. Also, the structural elements of the open test structures, as, for example, weighing machines and transmission ropes, possess such a low inherent frequency that it is impossible to follow the forces changing with regard to time in such structures.

The object of this invention is to measure the radial and side forces as well as the rolling friction, aligning torque and camber moments of rotating machine parts, especially vehicle tires, simultaneously in a common apparatus. Structurally this apparatus is as small as possible or, in other words, a so-called measuring hub which has sufficient inherent frequency in all directions. The individual structural elements that do the actual measuring are in a position to manage and measure forces up to 10,000 kg. and moments up to 500 mkg.

In general, in this invention, such is accomplished by dividing the tension and compression forces into three axes ($x$–$x$, $y$–$y$ and $z$–$z$) at right angles to each other and the moments are also divided into two directions ($M_x$, $M_z$) at right angles to each other and these forces and torques are transferred within a common frame or measuring hub to their individual measuring elements.

According to another inventive feature, the bodies to be tested enclose the outer frame of a Cardan joint whose center point coincides with the center of a testing apparatus and this frame is supported by two tension and compression measuring elements which lie in planes offset by 90° and which are flexurally resilient. A Cardan bar is connected by pairs of diaphragms which are mounted in the common frame so that in each instance the axial direction of the diaphragms terminates in a measuring element and whereas the diaphragms are rigidly connected in their planes to each other.

In this invention, the Cardan bar is supported by two diaphragms in an apparatus frame in such a manner that the Cardan bar bears in the axial $y$ direction on a tension and compression measuring element in the apparatus frame and that a yoke is suspended in the apparatus frame by two other diaphragms and four bands that are flexurally resilient within the common frame in such a manner that the force which is at right angles to the first direction of force can also bear on a tension and compression measuring element. However, at the same time, the diaphragms can also be supported by means of a connecting yoke in the direction of the force $P_x$ which is at right angles to the previously mentioned directions of forces $P_y$, $P_z$ and bearing on the apparatus frame through a tension and compression measuring element.

The Cardan bar in this invention is prevented from twisting or rotating by means of a disc which is connected by way of a loose intermediate ring with the common frame. Between the disc and the intermediate ring in the $x$–$x$ direction are flexurally resilient connecting elements and other flexurally resilient connecting elements are mounted in the $z$–$z$ direction between the intermediate rings and the apparatus frame and at right angles to the first-mentioned connecting elements.

The Cardan bar in this invention can be divided by a circular segment coupling between the engagement point for the measuring elements for $M_x$ and $M_z$ and the first diaphragm in the common frame. The center point for this circular segment coincides with the center of the Cardan joint. This makes it possible for the Cardan system and a part of the Cardan bar to be swung around an angle with regard to the remaining apparatus.

The means by which the objects of the invention are obtained are described more fully with reference to the accompanying drawings in which.

Figure 1:
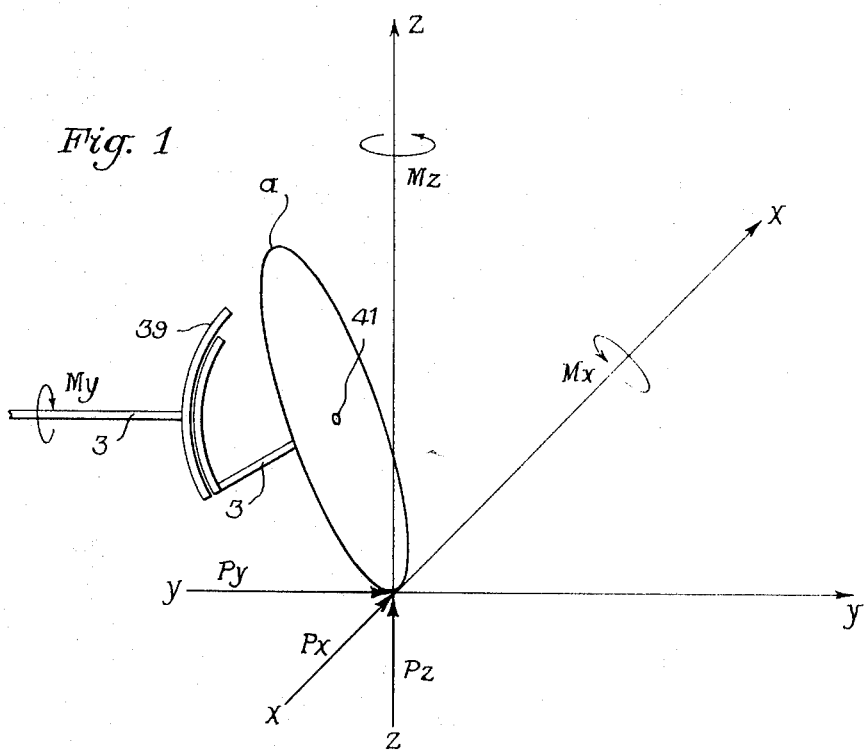
FIG. 1 is a schematic drawing of the relative forces and moments.

As shown in FIG. 1, three forces, the tire drag $P_x$, the cornering force $P_y$ and the radial load $P_z$ are at right angles to each other on the axes $x$–$x$, $y$–$y$ and $z$–$z$. The moments as shown by the arrows are camber moment $M_x$ and aligning torque $M_z$. The test body $a$ is shown as a circle. The Cardan bar 3 and the Cardan joint, not shown, are connected to a circular segment which is used to adjust the object being tested, as, for example, to simulate the camber setting of vehicle tires.

Figure 2:
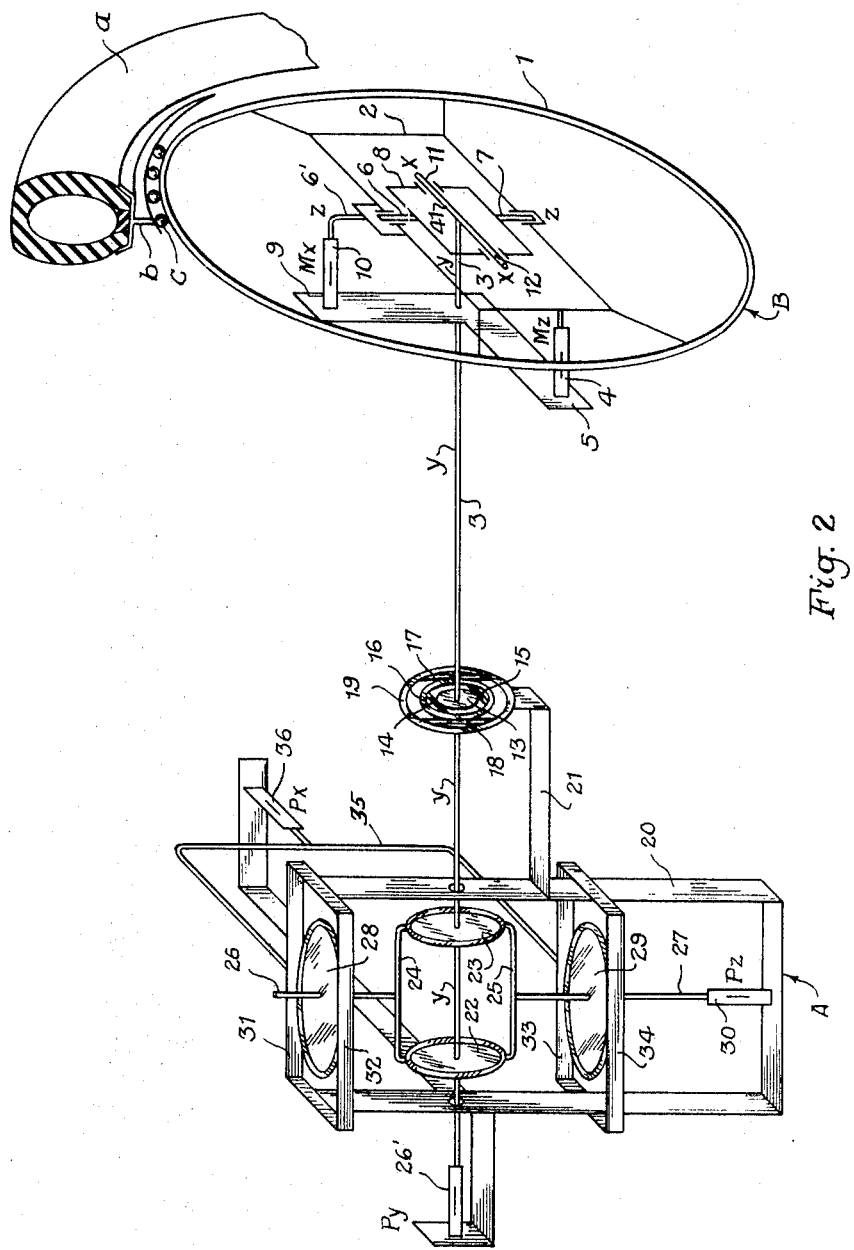
FIG. 2 is an expanded view of the essential parts of the apparatus.

In FIG. 2, the apparatus is shown expanded to show the part A which represents that portion of the measuring hub for the measuring of the forces and the part B which shows the part of the hub for measuring the moments.

The test body $a$, as, for example, a vehicle tire or wheel, is mounted on its rim $b$ which rides on roller bearing $c$ upon inner ring 1. In the plane of this ring 1 and thus also the bearing $c$ and actually in the common center is a Cardan joint having an outer frame 2. This Cardan joint has the axes $x$–$x$ and $z$–$z$ positioned so that the movement of the bearing C is made as small as possible around the $z$-axis as well as around the $x$-axis insofar as the measuring elements 4 and 10 are not installed. Further, the bearing is prevented from rotating around the $y$-axis which starts from the center of the Cardan joint. The Cardan bar 3 which starts from the center of the Cardan joint lies on the $y$-axis of the joint. The outer frame 2 bears on tension and compression measuring element 4 which is flexurally resilient and which can be provided with a strain gauge and which element, in turn, bears on arm 5 which is rigidly fastened to bar 3. Frame 2 is further rotatably supported on the $z$-axis by the shaft 6, 7 which is rigidly joined to an interior frame 8. Arm 5 extends in the $x$-direction and is fixed to an arm 9 extending in the $z$-direction. Outer frame 2 of the joint bears on tension and compression element 10 which is flexurally resilient to bending stresses and can be provided with strain gauges and which, in turn, bears on arm 9. Consequently, frame 2 bears on the two elements 4 and 10 which are flexurally resilient and are offset by 90° and through the arms on Cardan bar 3. Frame 8 on the other hand is supported on the rods 11 and 12 and is movable in the $x$-axis, said rods being rigidly joined to bar 3. The tension and compression elements 4 and 10 are used for measuring the torques $M_z$ and/or $M_x$.

The bearings for the shafts 6 and 7 can transfer radial as well as axial forces which is also true for bearings of rods 11 and 12. If a combination of forces and torques act on the body to be tested, then this is first transmitted to the ring 1 of the bearing $c$ and from there to cardan frame 2. This frame, because of its cardan suspension, is freely movable around the center point of the cardan joint, but nevertheless bears through measuring elements 4 and 10 against the arms 5 and 9 of the cardan rod 3 so that the $M_z$ is measured directly with element 4, while $M_x$ is measured through element 10. All of the forces in the $x$, $y$ and $z$-directions, as well as the torque $M_y$ of the rolling friction of bearing $c$ are transmitted to rod 3. The rolling friction $M_y$ is identical with the force $P_x$. Rolling friction $M_y$ is a continuous torque which circles rod 3 as shown in FIG. 1.

In order to separate rolling friction $M_y$ from the components of the cardan joint, rod 3 is provided with a disc 13 which is connected by means of horizontal elastic intermediate elements 14 and 15 as far as bending is concerned with an intermediate ring 16 which, in turn, is connected by way of vertical and elastic intermediate elements 17 and 18 with an outer ring 19 which is joined to common frame 20 by arm 21. Connecting elements 14 and 15 are somewhat flexible with regard to $Pz$ and connecting elements 17 and 18 are resilient with regard to $Px$. Both pairs of connecting elements are resilient with regard to $Py$, whereas $My$ bears against outer ring 19. $My$ is thus transmitted to common frame 20 and is thus isolated from the other structural parts.

Common frame 20 holds axis rod $y$ by means of several pairs of diaphragms, of which each releases the $y$-axis rod movement in one direction only and prevents it for all other directions. A measuring element for measuring the respective force components is mounted in each direction that has been released.

Rod 3 thus is supported in two diaphragms 22 and 23 which have rigid frames so that they will transmit all forces acting on the planes of the diaphragms but are resilient or soft in the direction at right angles to the plane of the diaphragms. With regard to diaphragms 22 and 23, this means that forces $Pz$ and $Px$ are transmitted through the diaphragm frames to the rigid connections 24 and 25 attached to the diaphragms. However, these diaphragms do not permit movement of the rod 3 in the $y$ direction. Rod 3 bears against a tension and compression element 26' which is resilient to bending stresses and in which force $Py$ is measured.

Yokes 24 and 25 transmit the forces $Pz$ and $Px$ through a transmission assembly 26 and 27 to diaphragms 28 and 29 which are resilient in the $Pz$ direction. This makes it possible that the radial rod $Pz$ contacts without distortion the measuring element 30 in which $Pz$ is measured. This measuring element again can have an expansion-measuring strip.

The force $Px$ is transmitted by way of the frames for the diaphragms 28 and 29 to the flexible members 31, 32, 33 and 34 which are resilient to bending in the $Px$ direction. This force $Px$ is received from the frame of the diaphragms 28 and 29 through a yoke 35 which, for purposes of illustration, has been shown on a large scale in the drawings and which transmits force $Px$ to measuring element 36 which is resilient to bending and in which force $Px$ is measured. Element 36 can also have a strain gauge.

It is within the scope of this invention to modify each individual part of the structural elements of the apparatus in order to fit the space available within the testing apparatus or vehicle.

Figure 3:
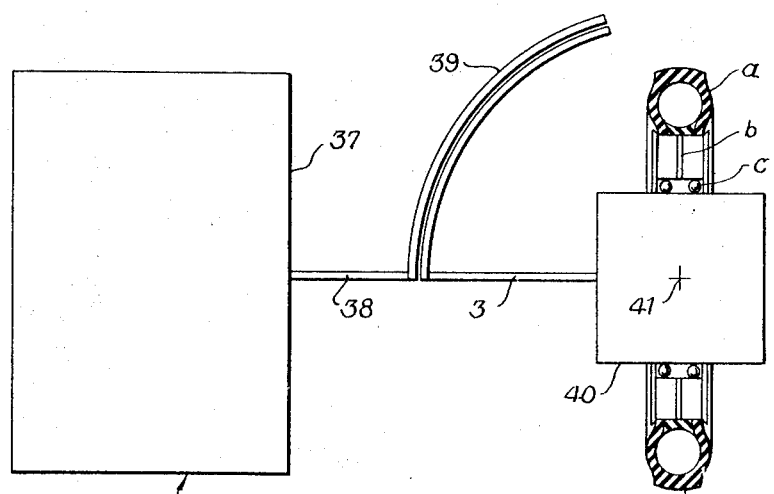
FIG. 3 is a schematic view representing the camber angle.

According to another feature of this invention a circular segment coupling can be incorporated in the rod 3 so that the part B of the measuring hub can transmit the forces and torques acting on the test body even when the test body does not rotate in a vertical plane but rotates in a plane at an angle thereto. This is schematically shown in FIG. 3 wherein the part A of FIG. 2 is contained in the box 37 and includes parts 13 to 36. Rod 38 which corresponds to rod 3 of FIG. 2 extends from box 37. This rod 38 carries a circular segment coupling 39 by means of which it is possible to swing part B of the measuring hub, and in which box 30 corresponds to part B of FIG. 2, around any desired angle and fixed in any position without changing the center 41 in part B of the measuring hub. Such displacement of part B has great significance for automobile tire test stands when measuring the forces and torques in connection with a planned tire camber angle. In this instance, great value is placed on the fact that the forces acting on the tire is placed on the fact that the forces acting on the tire $a$ are measured with the old $x$, $y$, $z$-coordinate system which is guaranteed inasmuch as part A is now swung at the same time.

Having now described the means by which the objects of the invention are obtained,

We claim:

1. An apparatus for determining the magnitude of multiaxial stressing in rotating machinery parts and in particular the radial load $Pz$, the cornering force $Py$, and tire drag $Px$, the aligning torque $Mz$ and the camber moment $Mx$ acting on a vehicle tire comprising a rim for mounting the tire, rolling element bearing means on a cardan frame for supporting said rim, three load cells positioned in the three space directions for taking up, respectively, the three forces $Pz$, $Py$ and $Px$, two load cells positioned perpendicular to each other for taking up the forces of the torque $Mz$ and the moment $Mx$, and mechanical transmission link means for transmitting the forces from the cardan frame to the load cells and from the load cells to a common frame, said link means including pivotal connections which are oriented for influencing each load cell, respectively, by only one of the forces in the measuring direction.

2. An apparatus as in claim 1 in which the center of said Cardan frame coincides with the center of said rim and said link means comprises a Cardan bar varying said Cardan frame by Cardanic suspension, said Cardan bar having two arms fixed thereto and projecting perpendicularly therefrom, the respective load cells for the forces $Mz$ and $Mx$ being connected between said Cardan frame and one of said arms, said Cardan bar bearing axially on the load cell for the force $Py$ and having a first pair of axially spaced diaphragms fixed perpendicularly thereto, said first pair of diaphragms being combined by yokes to form a trunnion assembly perpendicular to said Cardan bar, said trunnion assembly bearing on the load cell for the force $Pz$ and having a second pair of diaphragms fixed perpendicularly thereto, said second pair of diaphragms being connected by means of flexurally resilient members with said common frame and simultaneously transmit the force $Px$ via a yoke to the load cell for the force $Px$.

3. An apparatus as in claim 2, said apparatus being composed of a first part which includes the structure for measuring the $Pz$, $Py$ and $Px$ forces, a second part which includes the structure for measuring the forces $Mz$ and $Mx$, and further comprising circular segment coupling means joined to said Cardan bar for swinging said second part around the center of said Cardan frame and relative to said first part.